United States Patent
Cai et al.

(10) Patent No.: US 9,240,942 B2
(45) Date of Patent: Jan. 19, 2016

(54) BANDWIDTH UTILIZATION FOR EQUAL COST MULTIPLE PATHS

(75) Inventors: Yiqun Cai, Cupertino, CA (US); Heidi Ou, Saratoga, CA (US); Liming Wei, Fremont, CA (US); Apoorva Karan, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 816 days.

(21) Appl. No.: 12/932,604

(22) Filed: Feb. 28, 2011

(65) Prior Publication Data

US 2012/0218898 A1    Aug. 30, 2012

(51) Int. Cl.
*H04L 12/721* (2013.01)
*H04L 12/729* (2013.01)
*H04L 12/18* (2006.01)
*H04L 12/707* (2013.01)

(52) U.S. Cl.
CPC .......... *H04L 45/125* (2013.01); *H04L 12/1886* (2013.01); *H04L 45/24* (2013.01)

(58) Field of Classification Search
None
See application file for complete search history.

(56) References Cited

U.S. PATENT DOCUMENTS

| 6,728,777 B1* | 4/2004 | Lee et al. ..................... 709/238 |
| 7,903,654 B2 | 3/2011 | Bansal et al. |
| 2008/0013552 A1* | 1/2008 | Wright et al. ................. 370/401 |
| 2008/0175269 A1 | 7/2008 | Alvarez et al. |
| 2009/0190587 A1* | 7/2009 | Zhao et al. .................... 370/390 |

* cited by examiner

Primary Examiner — Rhonda Murphy
(74) Attorney, Agent, or Firm — Cindy Kaplan (57) ABSTRACT

In one embodiment, a method includes identifying a packet at an upstream node in communication with a source and in communication with a downstream node through equal cost multiple paths including first and second multi-access networks, the packet transmitted on the first multi-access network and associated with a multicast group, and transmitting from the upstream node a request to the downstream node to join the group on the second multi-access network, if the upstream node is already transmitting data to the group on the second multi-access network, or a bandwidth utilization at the first multi-access network exceeds a specified threshold. An apparatus is also disclosed.

20 Claims, 7 Drawing Sheets

BANDWIDTH UTILIZATION FOR EQUAL COST MULTIPLE PATHS

TECHNICAL FIELD

The present disclosure relates generally to communication networks, and more particularly, to improved bandwidth utilization for equal cost multiple paths (ECMP).

BACKGROUND

There is an increasing use of networks to deliver high bandwidth traffic using IP (Internet Protocol) multicast. ECMP (equal cost multiple paths) may be used within networks when load splitting of traffic such as IP multicast is needed to achieve a high utilization of multiple paths. Conventional systems typically use hash algorithms to select a path. This often leads to inefficient use of network resources.

BRIEF DESCRIPTION OF THE FIGURES

Corresponding reference characters indicate corresponding parts throughout the several views of the drawings.

DESCRIPTION OF EXAMPLE EMBODIMENTS

Overview

In one embodiment, a method generally comprises identifying a packet at an upstream node in communication with a source and in communication with a downstream node through equal cost multiple paths (ECMP) comprising first and second multi-access networks, the packet transmitted on the first multi-access network and associated with a multicast group, and transmitting from the upstream node a request to the downstream node to join the group on the second multi-access network, if the upstream node is already transmitting data to the group on the second multi-access network, or a bandwidth utilization at the first multi-access network exceeds a specified threshold.

In another embodiment, an apparatus generally comprises a processor for processing a packet at an upstream node configured for communication with a source and communication with a downstream node through equal cost multiple paths comprising first and second multi-access networks, the packet transmitted on the first multi-access network and associated with a multicast group, and generating for transmission to the downstream node, a request for the downstream node to join the group on the second multi-access network, if the upstream node is already transmitting data to the group on the second multi-access network. The apparatus further comprises memory for storing a list of multi-access networks in the ECMP.

In yet another embodiment, an apparatus generally comprises a processor for processing a packet at an upstream node configured for communication with a source and communication with a downstream node through equal cost multiple paths comprising first and second multi-access networks, the packet transmitted on the first multi-access network and associated with a multicast group, and generating for transmission to the downstream node, a request for the downstream node to join the group on the second multi-access network, if a bandwidth utilization on the first multi-access network exceeds a threshold. The apparatus further comprises memory for storing a list of multi-access networks in the ECMP.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

In networks delivering high bandwidth data flow (e.g., video traffic having bandwidths between 5 Mbps and 30 Mbps per flow) multiple paths may be used to provide redundancy and increased throughput. A router may use RPF (reverse path forwarding) to select an upstream interface and a neighbor on that interface to build a forwarding state.

The embodiments described herein provide an ECMP (equal cost multiple paths) path selection for improved bandwidth utilization and protection against over-subscription. In one embodiment, an RPF interface and neighbor are selected based on bandwidth utilization. The embodiments may be used, for example, to perform load splitting with ECMP based on bandwidth.

Figure 1:
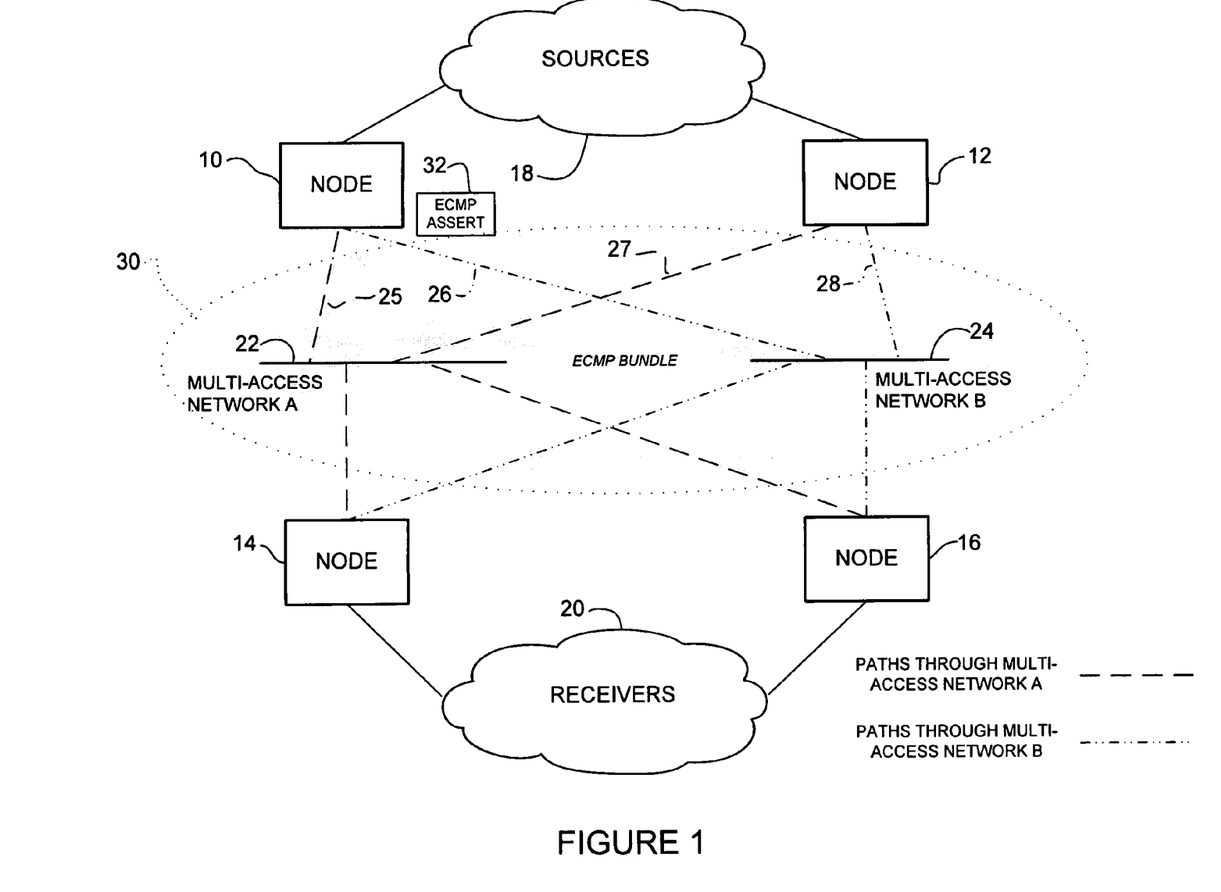
FIG. 1 illustrates an example of a network in which embodiments described herein may be implemented.

Referring now to the figures, and first to FIG. 1, an example of a network in which the embodiments described herein may be implemented is shown. The embodiments operate in the context of a data communication network including multiple network devices (nodes). The network includes nodes 10, 12, 14, and 16, which may be routers (e.g., PIM (Protocol Independent Multicast) routers) or any other network device configured to perform routing or forwarding operations. In the example shown in FIG. 1, nodes 10 and 12 operate as upstream nodes and are connected to one or more sources 18 of data flow to be sent to one or more receivers 20 via downstream nodes 14 and 16. It is to be understood that the terms 'upstream' and 'downstream' as used herein refer to the flow of traffic from a source to a receiver. Thus, the nodes may operate as both upstream and downstream nodes for different traffic flows.

The sources 18 are configured to originate and the receivers 20 are configured to terminate communications over the network. The sources 18 and receivers 20 may be any device configured for transmitting, receiving, or transmitting and receiving data flows. For example, the source 18 may be a content provider of broadcast video (e.g., cable company, digital satellite company), content delivery node, server, etc. The receiver 20 may be, for example, a server, host, personal computer, media center device, mobile device (e.g., phone, personal digital assistant, digital media player), set-top box, or any other device.

The traffic (data flow) between the sources 18 and receivers 20 may comprise content (e.g., media content), including, for example, video, audio, data, or any combination thereof. The media content may be transmitted as streaming media or media files, for example, and the data may be encrypted, compressed, or encoded according to any format.

In one example, the data flow is a multicast transmission, and may comprise, for example, IPv4 multicast, IPv6 multicast, or IPv4/IPv6 multicast using MPLS (Multiprotocol Label Switching) encapsulation. Multicast transmissions may be used, for example, in applications of IPTV where broadcast video is transmitted to a number of destinations (e.g., receivers 20). In IP multicasting, the source 18 may specify a destination IP address that may comprise a multicast group address for at least one receiver to receive the data flow.

The nodes 10 and 12 are in communication with nodes 14 and 16 via multi-access networks 22 and 24. The multi-access networks 22, 24 may be, for example, LANs (local area networks), rings, or any other arrangement of nodes forming a network which includes multiple access (e.g., network can be accessed by multiple nodes). Rings may be, for example, DPT (dynamic packet transport) rings. The DPT rings are implemented as two counter-rotating rings which may both be used at the same time. The DPT design provides redundancy in case of a fiber cut or link failure.

The multi-access networks 22, 24 form equal cost multiple paths between the upstream nodes 10, 12 and downstream nodes 14, 16. Each ECMP data path is substantially equally capable of carrying a data flow or a data packet of a data flow between the network nodes. The multi-access networks 22, 24 are preferably provisioned as ECMP routes in IGP (interior gateway protocol) and a single instance of IGP is run, which supports ECMP.

The example shown in FIG. 1 includes equal cost multiple paths extending from nodes 10 and 12 to nodes 14 and 16. Node 14, for example, is in communication with sources 18 through four equal cost multiple paths 25, 26, 27, 28. Path 25 extends from node 10, through multi-access network (LAN) A to node 14, path 26 extends from node 10 through LAN B to node 14, path 27 extends from node 12 through LAN A to node 14, and path 28 extends from node 12 through LAN B to node 14. Similarly, node 16 is in communication with the sources 18 through four equal cost multiple paths. From the point of view of the downstream nodes 14, 16, each of the paths can be identified by a combination of the multi-access network and an upstream node (e.g., LAN A/node 10, LAN A/node 12, LAN B/node 10, LAN B/node 12).

It is to be understood that the network shown in FIG. 1 and described herein is only an example and that the embodiments may be implemented in networks having different network topologies and network devices, without departing from the scope of the embodiments. For example, there may be any number of paths and multi-access networks between the sources 18 and receivers 20, and any number (e.g., 1 or more) of sources or receivers. There may be any number of intermediate nodes such as routers, switches, or gateways located between the sources 18 and receivers 20.

Figure 2:
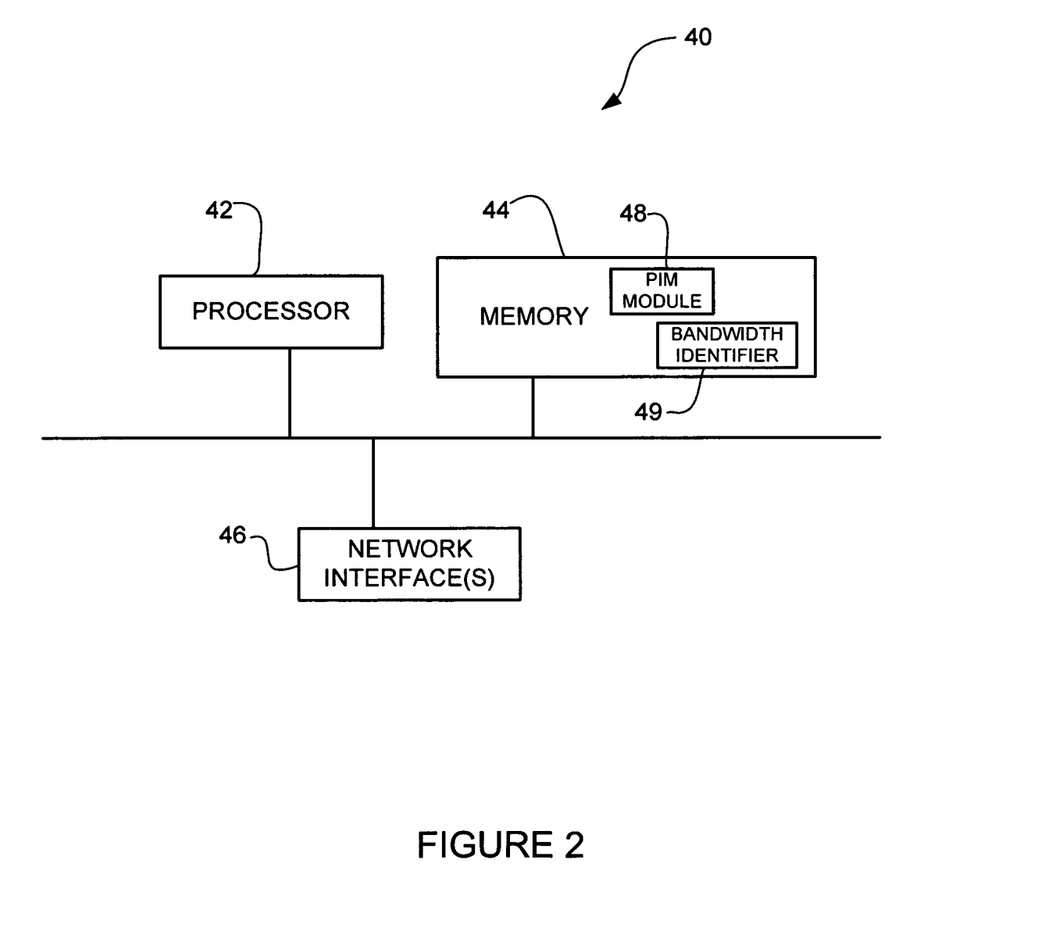
FIG. 2 depicts an example of a network device that may be used to implement the embodiments.

FIG. 2 illustrates an example of a network device (e.g., router) 40 that may be used to implement the embodiments described herein. In one embodiment, the network device 40 is a programmable machine that may be implemented in hardware, software, or any combination thereof The network device 40 includes one or more processors 42, memory 44, and one or more network interfaces 46. Memory 44 may be a volatile memory or non-volatile storage, which stores various applications, operating systems, modules, and data for execution and use by the processor 42. Memory 44 may include a list of the multi-access networks in the ECMP.

Logic may be encoded in one or more tangible media for execution by the processor 42. For example, the processor 42 may execute codes stored in a computer-readable medium such as memory 44. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

An operating system, portions of which may be resident in memory 44 and executed by the processor 42, may functionally organize the network node by invoking network operations in support of software processes executing on the processor. These software processes may include PIM module 48 and a bandwidth identifier 49. The memory 44 may also include a routing information base (RIB) (not shown). The PIM module 48 may rely on an underlying topology-gathering protocol to populate a routing table for the RIB to establish and maintain paths or routes. The PIM module 48 may also generate and transmit an ECMP assert packet 32 (described below). The bandwidth identifier 49 may be used to collect interface statistics, for example.

The network interface 46 may comprise one or more wired or wireless interfaces (linecards, ports) for receiving signals or data or transmitting signals or data to other devices. The interfaces 46 may include, for example, an Ethernet interface for connection to a computer or network.

It is to be understood that the network device 40 shown in FIG. 2 and described above is only one example and that different configurations of network devices may be used.

Referring again to FIG. 1, in order to create optimal shortest path data paths during ECMP multicasting, receivers 20 may notify their desire to receive particular data flows destined for an IP multicast group address. This may be accomplished by sending a join (e.g., join message, multicast reception request) to the source 18 of the data flow. The join messages are sent hop-by-hop along a data path towards the source 18. The source 18 may then send the requested data flow towards the direction that the original join message came from. The process of selecting a path to send joins towards the source is called reverse path forwarding (RPF). As described below, ECMP asserts are used to influence RPF decisions between PIM enabled interfaces.

In one embodiment, the multi-access networks form an ECMP bundle. In the example of FIG. 1, paths 25, 26, 27, and 28 form ECMP bundle 30, which is created on both upstream nodes 10, 12 and downstream nodes 14, 16. The ECMP bundle 30 is configured to have multiple independent layer 3 (L3) interfaces. The ECMP bundle 30 is preferably created regardless of whether an interface is up or not. IGP and PIM are run on each individual interface, therefore creating ECMP between upstream and downstream nodes. There can be one or more ECMP bundle on each node.

In one embodiment, a packet (referred to herein as a PIM ECMP assert) 32 is transmitted by the upstream router 10, 12 to request the downstream router 14, 16 to join another interface (desired interface). As described below, the PIM ECMP assert packet 32 may be used to avoid the use of different multi-access networks 22, 24 within an ECMP for the same group (e.g., (*, G) or (S, G)), or prevent the multi-access network from exceeding a specified bandwidth threshold.

The PIM ECMP assert may be triggered by receiving PIM join messages from 'non-desired' outgoing interfaces. The ECMP assert packet 32 may be sent, for example, when a node detects a PIM join on a non-desired outgoing interface or the node detects multicast traffic on a non-desired outgoing interface. The ECMP assert packet 32 is transmitted to the non-desired interface. An outgoing interface may be considered non-desired when the upstream node 10, 12 is already forwarding the same flow out of another interface belonging to the same ECMP bundle 30, or the upstream node is not yet forwarding the flow out of any interfaces of the ECMP bundle, but there is another interface with more desired attributes (e.g., bandwidth utilization, data transmission delay). Multiple (S, G)s may be aggregated in the assert packet 32.

Figure 3:
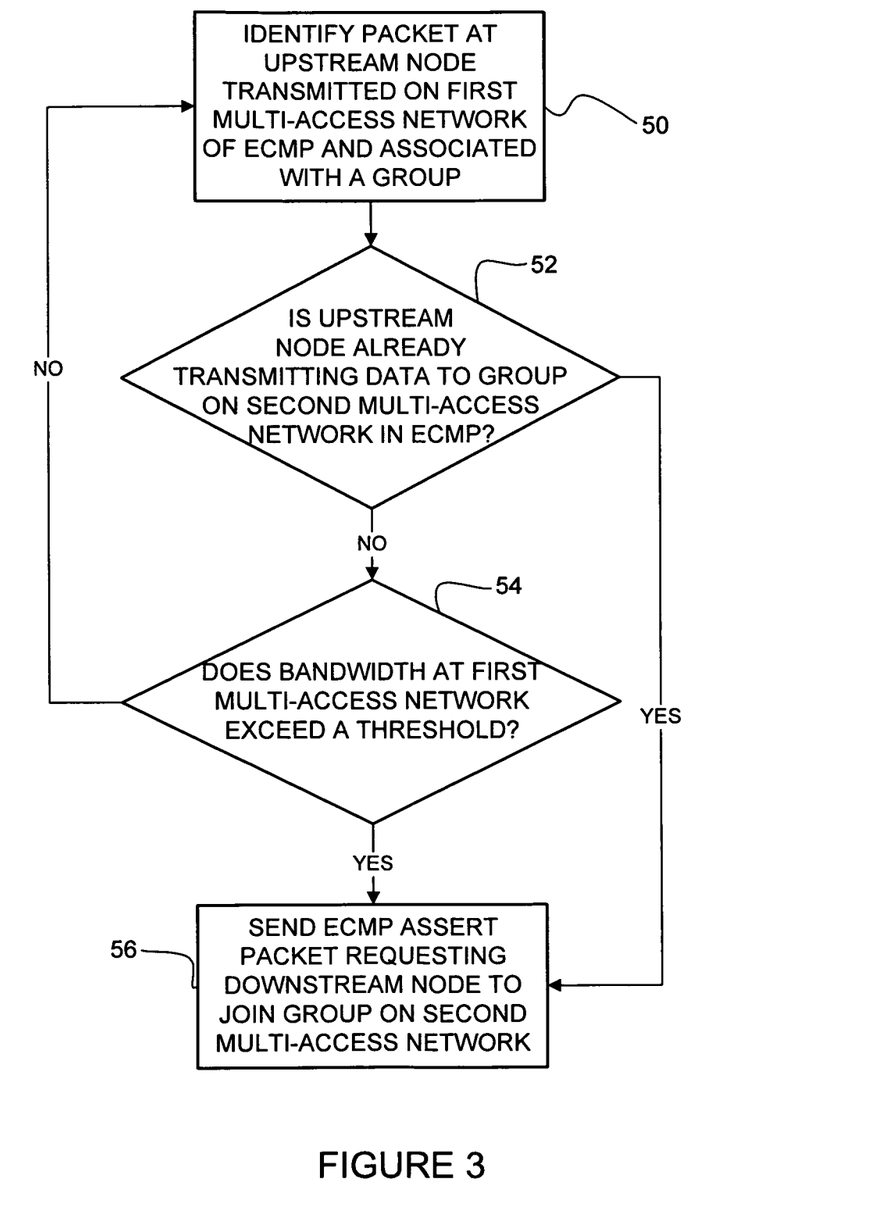
FIG. 3 is a flowchart illustrating a process for bandwidth aware ECMP selection, in accordance with one embodiment.

FIG. 3 is a flowchart illustrating a process for bandwidth aware ECMP RPF selection, in accordance with one embodiment. When one of the nodes 14, 16 downstream of the ECMP interface creates a new group entry (e.g., (*, G) or (S, G) entry), it populates the RPF interface and RPF neighbor information. The node 14, 16 sends its initial join message to that RPF neighbor. At step 50, the join message (e.g., packet associated with multicast group) is identified at an upstream node (e.g., node 10 in FIG. 1) in communication with source 18 and in communication with receiver 20 via equal cost multiple paths comprising first and second multi-access networks 22, 24. The join message is transmitted from a downstream node (e.g., node 14 in FIG. 1) on the first multi-access network and is a request to receive data for the multicast group. When the upstream node 10 (RPF neighbor) receives the join message and finds that the receiving interface is one of the ECMP interfaces, it checks to see if the same flow is already being forwarded out of another ECMP interface (e.g., interface for second multi-access network) (step 52).

If the upstream node 10 is not already transmitting data to the group over the second multi-access network, the node may optionally check to see if bandwidth utilization at the first multi-access network exceeds a threshold bandwidth utilization value (step 54). The threshold value may be a bandwidth limit at the multi-access network or a limit for a difference in bandwidth utilization between the two multi-access networks. If the answer to either step 52 or 54 is yes, the node 10 sends an ECMP assert packet (request) 32 to the downstream node 14 that transmitted the join message. The assert packet requests the downstream node 14 to redirect PIM join messages to an RPF neighbor via a different interface (e.g., interface associated with the second multi-access network) (step 56). When the downstream node 14 receives the ECMP assert message, the node preferably transmits a PIM join message towards the new RPF interface specified in the ECMP assert packet and prunes itself from the previous RPF interface.

It is to be understood that the process shown in FIG. 3 and described above is only one example and that steps may be added, removed, reordered, or combined without departing from the scope of the embodiments. For example, only step 52 or 54 may be performed, without the other step.

In one embodiment, the ECMP assert packet 32 comprises a PIM packet and includes: group address, source address, neighbor address (desired upstream neighbor to which the downstream receiver should redirect PIM joins), interface identifier (ID assigned to a router's interface (e.g., globally unique ID)), preference (first tie breaker when ECMP asserts from multiple upstream routers are compared against one another), and a metric. The neighbor address combined with the interface ID uniquely identifies a multi-access network and an upstream router to which the downstream router should redirect its join message. The metric may contain path parameters defined by users (e.g., bandwidth, timestamp indicating when the sending router started to forward out of the interface). The metric is the second tie breaker if the preference values are the same. If both the preference and metric values are the same, neighbor address and interface ID fields may be used as the third tie-breaker (e.g., bigger address wins).

In one embodiment, if the downstream node 14, 16 receives multiple ECMP assert messages transmitted by different upstream nodes 10, 12, the downstream node uses the metric field as the tie breaker to choose the more preferred RPF interface and neighbor. If the upstream node 10, 12 receives an ECMP assert from another upstream router, it preferably does not change its forwarding behavior even if the ECMP asset makes it a less preferred RPF neighbor on the receiving interface.

Bandwidth utilization of the multi-access networks 22, 24 may be estimated from corresponding interface statistics. For example, counters may be accessed by PIM. The bandwidth information may also be obtained, for example, as described in U.S. Patent Application Publication No. 2008/0175269, published Jul. 24, 2008.

The following provides examples for the process described above with respect to FIG. 3. As shown in FIGS. 4-7, the multi-access networks in these examples include rings 62 (A) and 64 (B). In the following examples, node 14 chooses ring A/node 10 for its RPF interface, when the node selects an RPF interface for the first time for an (S, G) entry. If node 16 also selects ring A/node 10 for its RPF interface, no ECMP assert is required since (S, G) state is created on both nodes 14 and 16 with RPF neighbor pointing to node 10 via ring A interface. If node 16 selects ring A/node 12 for its RPF interface, other PIM mechanisms may be used to eliminate duplicates.

Figure 4:
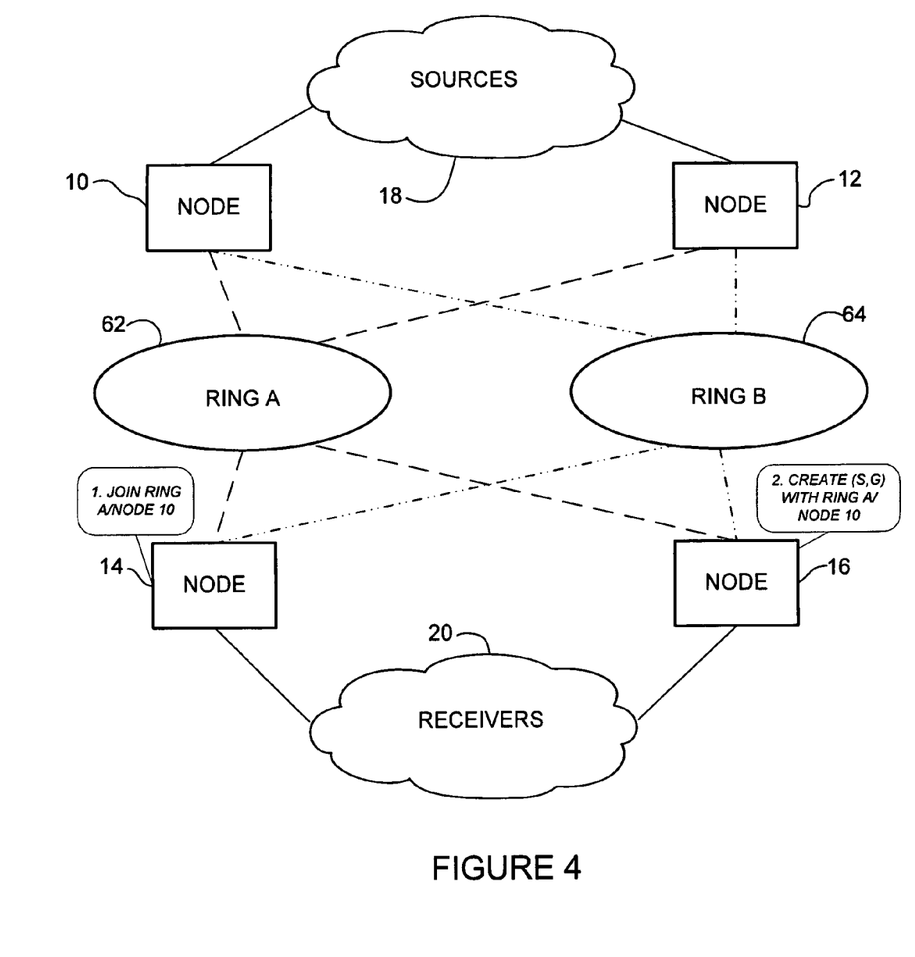
FIG. 4 illustrates a first example of a node selecting an RPF interface.

FIG. 4 illustrates a case in which node 16 does not have an (S, G) state. In this example, node 14 decides RPF for the first time for an (S, G) entry and chooses the RPF interface for the path with the highest remaining bandwidth (e.g., ring A/node 10). Node 14 sends a PIM join message on ring A. Upon seeing this join message, node 16 also creates the corresponding (S, G)/(*, G) join using ring A and node 10. As long as ring A is one of the candidate interfaces for RPF, node 16 will use the same ring A/node 10 as the RPF interface. This is done to help ensure that node 16 uses the same multi-access network to receive the same traffic whenever possible.

Figure 5:
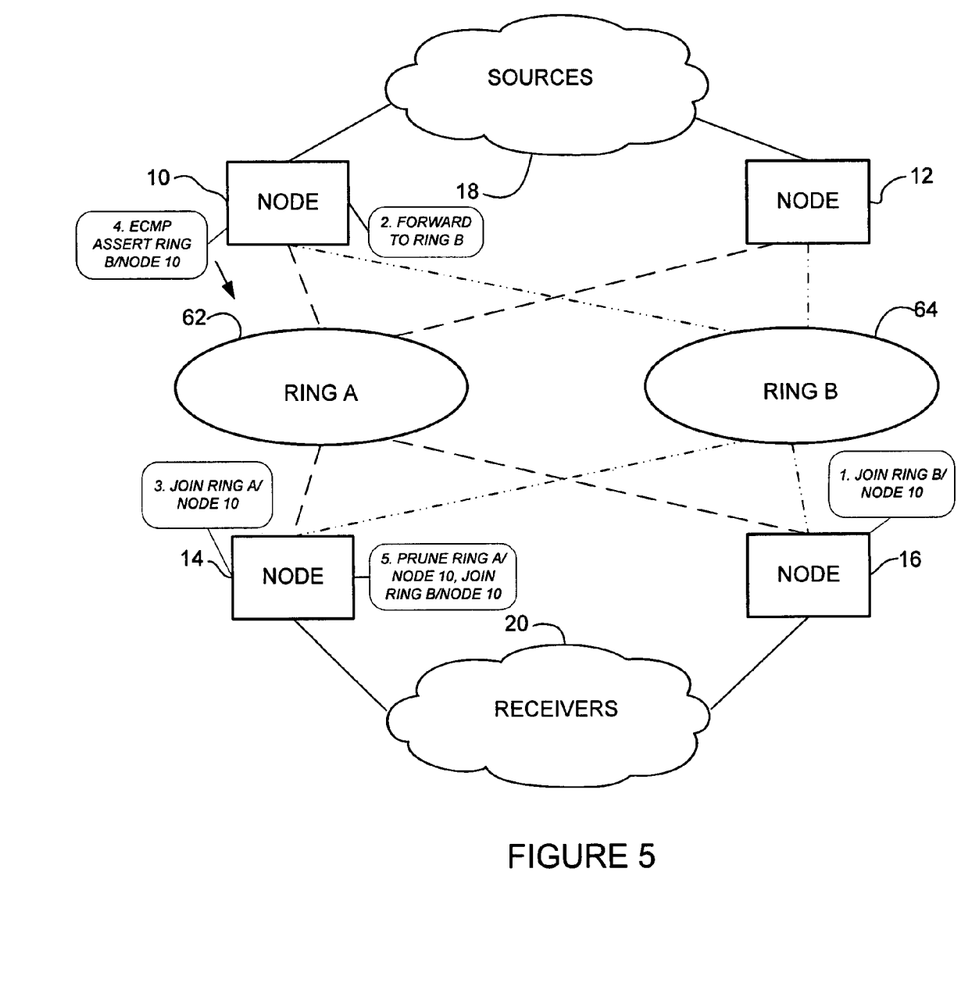
FIG. 5 illustrates a second example of the node selecting an RPF interface.

FIG. 5 illustrates an example in which node 16 has an (S, G) state RPF for ring B/node 10. Traffic is forwarded by node 10 to ring B. Node 14 then sends a join for (S, G) towards ring A and node 10. Node 10 sees the join message on ring A and generates an ECMP assert with desired neighbor node 10 on ring B. Node 10 forwards the ECMP assert packet to node 14 on ring A. When node 14 receives the ECMP assert packet and detects the desired RPF path from its upstream router's point of view is different from its current one, it prunes from its current path (ring A/node 10) and joins the new path (ring B/node 10). This may be done in any order.

Figure 6:
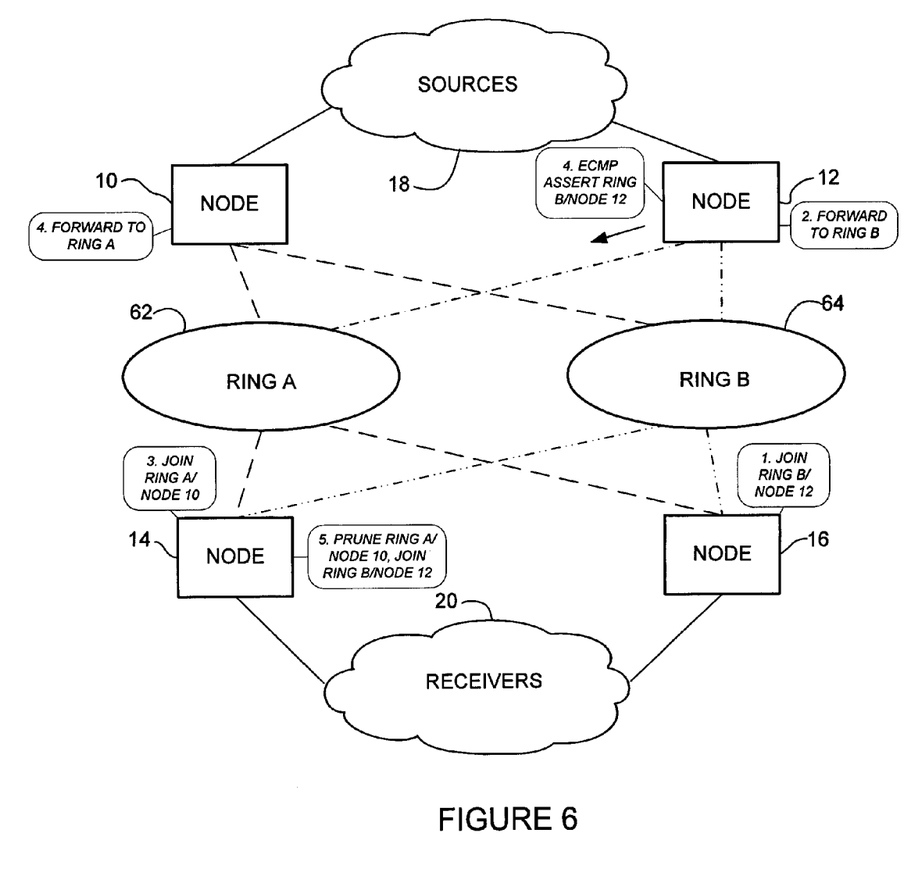
FIG. 6 illustrates a third example of the node selecting an RPF interface.

FIG. 6 illustrates a case in which node 16 has (S, G) state RPF for ring B/node 12. Node 12 forwards traffic to node 16 on ring B. Node 14 then sends a join message for (S, G) towards ring A/node 10. Node 10 forwards traffic to node 14 on ring A. Node 12 identifies the join message from node 14 or multicast traffic of (S, G) on ring A and transmits on ring A an ECMP assert packet with desired neighbor 12 on ring B. Node 14 receives the assert packet, prunes ring A/node 10 and joins ring B/node 12.

Figure 7:
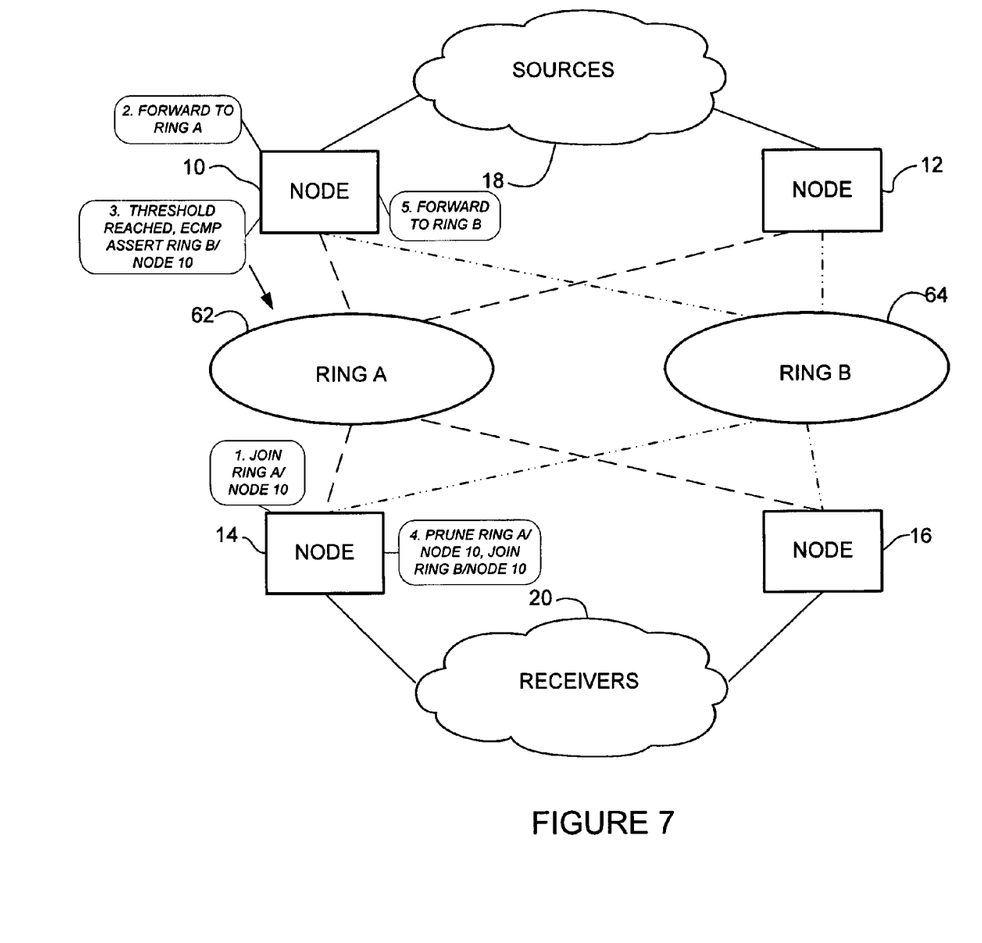
FIG. 7 illustrates an example of protection of multi-access networks against over-subscription.

FIG. 7 illustrates an example for protection against oversubscription at one of the multi-access networks 62, 64. Node 14 joins ring A/node 10 and node 10 forwards traffic to node 14 on ring A. In this example, node 10 sees that ring A is at 80% utilization, while ring B is at 20% utilization. The bandwidth utilization between the two rings A, B has thus become disparate. Once a threshold is reached for the bandwidth utilization at one of the rings A, B or a difference in bandwidth utilization between the two rings, node 10 transmits an ECMP assert to node 14 on ring A to instruct node 14 to join ring B/node 10. Node 14 prunes ring A/node 10 and joins ring B/node 10.

In one embodiment, each PIM enabled interface is configured with two bandwidth threshold values, one for sending and one for receiving. The sending bandwidth may be included in periodic PIM Hellos. The sending and receiving bandwidth is typically the same, but may be different when asymmetrical routing is used. The bandwidth threshold value may be the same as or smaller than the interface bandwidth. When the value is smaller, it rate limits what multicast can use and leaves more room for unicast. This allows multicast to be friendly to unicast traffic engineering.

The sending bandwidth may be configured to be smaller than that of the interface. For example, in order to support a fifty percent utilization limit, a sending bandwidth of 5G for multicast may be configured on a 10G interface. The upstream router compares the actual bandwidth used and the configured sending bandwidth. If the actual bandwidth is larger, it uses PIM ECMP assert to move some of the (S, G) to other rings.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving a packet comprising a join message at an upstream node in communication with a source and in communication with a downstream node through equal cost multiple paths (ECMP) comprising first and second multi-access networks, the packet transmitted on said first multi-access network and associated with a multicast group;
   identifying that the packet was received at an ECMP interface and detecting that the packet was received on a non-desired interface of the ECMP, wherein detecting comprises determining that the upstream node is already transmitting data to said multicast group on said second multi-access network or a bandwidth utilization at said first multi-access network exceeds a specified threshold; and
   transmitting an assert packet from the upstream node to the downstream node, said assert packet requesting the downstream node to redirect said join message to an interface associated with said second multi-access network to join said multicast group on said second multi-access network;
   wherein said multi-access networks each comprise a plurality of nodes forming a network that can be accessed by multiple nodes.

2. The method of claim 1 wherein said join message is transmitted from the downstream node.

3. The method of claim 1 wherein the packet comprises multicast traffic transmitted to the downstream node.

4. The method of claim 1 wherein transmitting said request comprises transmitting a Protocol Independent Multicast (PIM) packet.

5. The method of claim 4 wherein said PIM packet comprises a neighbor address and an interface identifier.

6. The method of claim 4 wherein said PIM packet comprises a timestamp indicating a start of the upstream node transmitting data to said group on said second multi-access network.

7. The method of claim 1 wherein each of said first and second multi-access networks comprises a ring.

8. The method of claim 1 wherein each of said first and second multi-access networks comprises a local area network.

9. The method of claim 1 wherein said paths form an ECMP bundle.

10. An apparatus comprising:
    a processor for processing a packet comprising a join message at an upstream node configured for communication with a source and communication with a downstream node through equal cost multiple paths (ECMP) comprising first and second multi-access networks, the packet transmitted on said first multi-access network and associated with a multicast group, identifying that the packet was received at an ECMP interface and detecting that the packet was received on a non-desired interface of the ECMP, wherein detecting comprises determining that the upstream node is already transmitting data to said multicast group on said second multi-access network or a bandwidth utilization at said first multi-access network exceeds a specified threshold, and generating transmission to the downstream node, an assert packet, said assert packet requesting for the downstream node to redirect said join message to an interface associated with said second multi-access network to join said multicast group on said second multi-access network; and
    memory for storing a list of said multi-access networks in said ECMP;
    wherein said multi-access networks each comprise a plurality of nodes forming a network that can be accessed by multiple nodes.

11. The apparatus of claim 10 wherein said join message is transmitted from the downstream node.

12. The apparatus of claim 10 wherein the packet comprises multicast traffic transmitted to the downstream node.

13. The apparatus of claim 10 wherein transmitting said request comprises transmitting a Protocol Independent Multicast (PIM) packet.

14. The apparatus of claim 13 wherein said PIM packet comprises a neighbor address and an interface identifier.

15. The apparatus of claim 13 wherein said PIM packet comprises a timestamp indicating a start of the upstream node transmitting data to said group on said second multi-access network.

16. An apparatus comprising:
    a processor for processing a packet at an upstream node configured for communication with a source and communication with a downstream node through equal cost multiple paths (ECMP) comprising first and second multi-access networks, the packet comprising a join message and transmitted on said first multi-access network and associated with a multicast group, identifying that the packet was received at an ECMP interface and detecting that the packet was received on a non-desired interface of the ECMP, wherein detecting comprises determining that the upstream node is already transmitting data to said multicast group on said second multi-access network or a bandwidth utilization at said first multi-access network exceeds a specified threshold; and
    generating for transmission to the downstream node, a request for the downstream node to join said group on said second multi-access network; and memory for storing a list of said multi-access networks in said ECMP;

wherein said multi-access networks each comprise a plurality of nodes forming a network that can be accessed by multiple nodes and at least one of said first and second multi-access networks comprise a local area network or a ring.

17. The apparatus of claim 16 wherein said threshold comprises a difference in bandwidth utilization at said first and second multi-access networks.

18. The apparatus of claim 16 wherein said request comprises a Protocol Independent Multicast (PIM) packet.

19. The apparatus of claim 18 wherein said PIM packet comprises bandwidth of an interface.

20. The apparatus of claim 16 wherein said bandwidth utilization is based on interface statistics.

* * * * *